July 2, 1935.  E. T. VINCENT ET AL  2,006,972
ENGINE
Filed Jan. 5, 1934
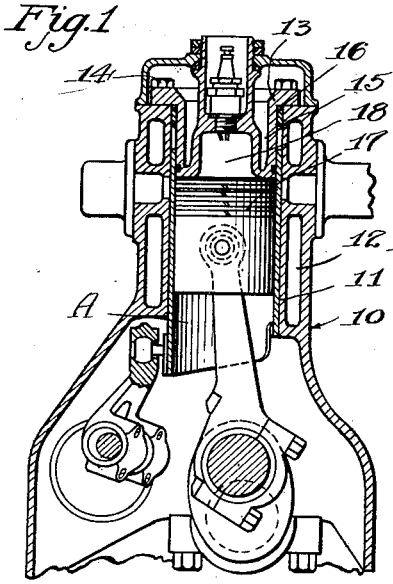
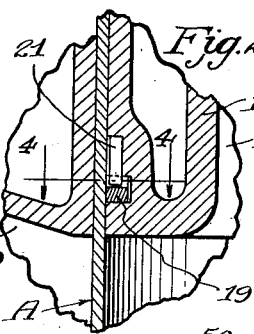
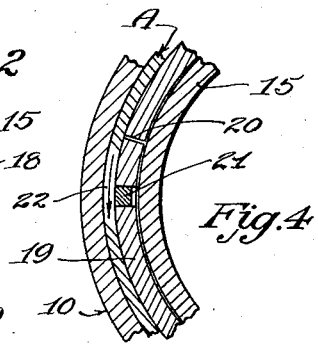
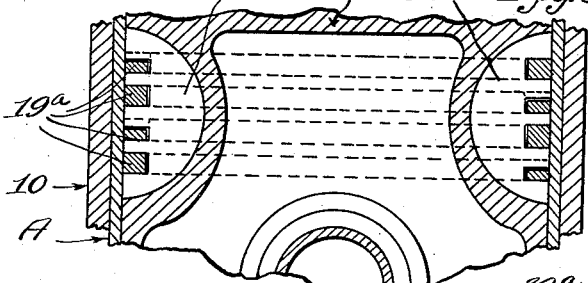
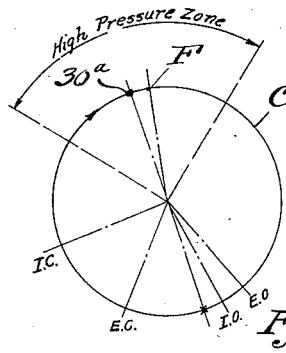
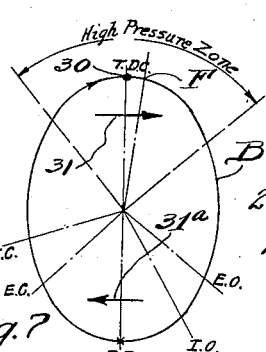
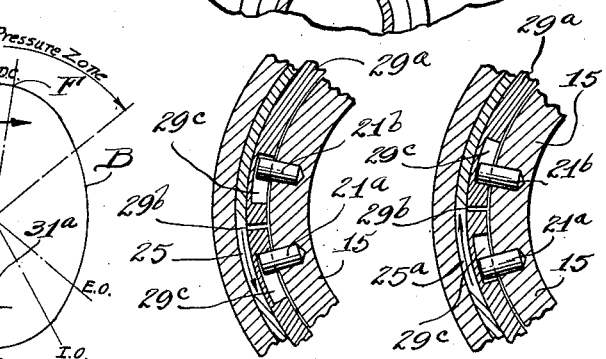
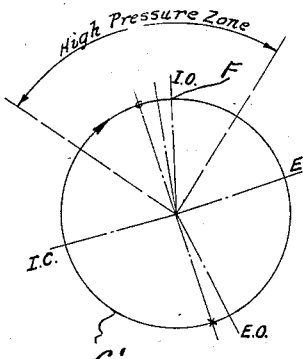
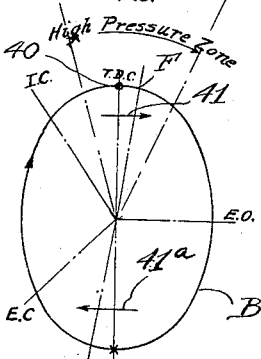
INVENTORS.
Edward T. Vincent
BY John R. McVeigh
ATTORNEY.

Patented July 2, 1935

2,006,972

UNITED STATES PATENT OFFICE 2,006,972

ENGINE

Edward T. Vincent and John R. McVeigh, Detroit, Mich., assignors to Continental Motors Corporation, Detroit, Mich., a corporation of Virginia Application January 5, 1934, Serial No. 705,306

14 Claims. (Cl. 123—81)

Our invention relates to engines and to the sealing means intermediate two engine elements having a relative rotary motion during at least a part of the engine operation, and more particularly our invention pertains to an engine of the sleeve valve type and especially to one having sleeve valve means of the combined oscillating and reciprocating type in which the sleeve valve means is moved with a rotary motion during a portion of the engine cycle because of the oscillatory motion imparted thereto.

Sealing means of the general type as shown in the illustrated embodiment of the invention are usually employed intermediate the sleeve valve means and the re-entrant cylinder head portion and also intermediate said sleeve valve means and the piston, whereby to seal the combustion chamber against leakage of the fluid particularly when the fluid is subjected to pressure. It will be observed that the sealing means consists in general of a split ring which is supported by an engine element (the cylinder head or piston) for yielding engagement with the sleeve valve means. Heretofore constructions of this character have been such as to not adequately seal the combustion chamber unless relatively close clearances are maintained which obviously is detrimental to the efficient operation of the engine.

With the incorporation of split sealing rings with the cylinder head or piston, or both, it will be noticed that the rotary motion of the sleeve valve with respect to the ring supporting engine element is such as to induce a braking effect of the ring with respect to the sleeve valve means or other engine element yieldingly engaged thereby by reason of the self energizing braking effect introduced in the sealing element or ring by said sleeve motion due to it being necessary to lock the ring against rotation so that the splits in the ring always travel over bridge portions between ports in the sleeve valve means.

The disadvantages of the above described construction are such, that when the induced braking effect of the ring with the sleeve valve means occurs, the ring has a tendency to bind against the sleeve valve means, thereby increasing engine friction and decreasing power output of the engine if not actually causing the ring to seize with the sleeve with the consequence that something has to break.

An object of our present invention is to provide an engine construction in which the aforesaid disadvantages are eliminated by providing a sealing means intermediate the relatively moving engine elements in which the tendency of the ring carried by one element to produce a self energizing braking effect by the rotary movement of said other engine element is prevented by the proposed means for locking or securing the sealing ring to said first engine element.

Another object of our invention is to provide a device of the character described in which a sealing ring is supported by an engine element for yielding engagement with the engine sleeve valve means which provides for a rotary motion of said sleeve valve means during a portion at least of the engine cycle by providing a resilient split sealing ring which, when fixed to said engine element against relative rotation, tends to normally expand, and to secure or lock said sealing ring to the engine element by fastening that portion of the sealing ring adjacent the split to the engine element in such a manner as to prevent the split sealing ring unwrapping from the inner engine element.

We have discovered that the siezing of the sealing ring with respect to the sleeve valve means, when the ring is fixed against relative rotation with respect to its support, is such as to decrease engine efficiency and to provide a force exerted circumferentially of the sleeve sufficient to shear or otherwise break the usual type of fastening means devised for keying the rings to the engine body structure associated therewith.

For a more detailed understanding of the invention, reference may be had to the accompanying drawing which illustrates one form which the invention may assume, and in which:

Fig. 1 is a vertical fragmentary transverse sectional view through a typical internal combustion engine cylinder employing a suitable sleeve valve means for controlling engine cyclical events.

Fig. 2 is an enlarged fragmentary vertical sectional view showing the particular construction of our sealing ring as proposed for assembly with a re-entrant cylinder head.

Fig. 3 is an enlarged detail fragmentary sectional view of the piston, and showing our invention as being incorporated therewith.

Fig. 4 is an enlarged horizontal sectional view of the sealing ring locking means and taken substantially on the line 4—4 of Fig. 2, Figs. 5 and 6 are enlarged detail fragmentary views of a modified form of construction and respectively showing two positions of the cooperating parts.

Fig. 7 is a composite timing diagram view showing the timing of the engine crank and sleeve valve means as proposed for an engine of the two stroke cycle type, and Fig. 8 is a composite timing diagram view showing the timing of the engine crank and sleeve valve means as proposed for an engine of the four stroke cycle type.

In the illustrated embodiment of our invention it will be noted that we have preferably shown our invention as incorporated with an engine of the single sleeve valve type in which the sleeve valve is given a combined oscillating and reciprocating motion relative to the cylinder and sleeve axes. It will be obvious that the principles of our invention may be readily incorporated in engines other than that of the type illustrated, and the broad principles of our invention may be adopted for the purpose of sealing the joint between any two relatively rotary movable engine elements. In the following specification and claims it will be understood that reference to the rotary motion of the engine elements or sleeve valve means, will define a sleeve valve of the type which rotates continuously or periodically in one direction as well as the combined movement type as illustrated.

In the drawing, 10 designates an engine block having a cylinder 11 and suitable water jackets 12 associated therewith. A cylinder head 13 is secured to the cylinder block by means of bolts or other fastening devices 14 and provides a re-entrant head portion 15 of suitable construction whereby to provide a sleeve pocket 16 adapted for receiving the outer end of the sleeve valve means. A piston 17 is arranged for operation within the sleeve valve means, and is concentrically arranged with respect to said sleeve valve means substantially in the same manner as is the re-entrant portion of the cylinder head. It will be observed that the cylinder head and piston define a combustion chamber 18, each of these engine elements providing one of the bounding walls of the combustion chamber. As more particularly illustrated in Figs. 1, 2 and 4, it will be noted that a sealing ring 19 is supported within the re-entrant cylinder head portion, while in Fig. 3 the sealing rings 19a are shown as being incorporated in the piston of said engine.

Referring more particularly to Figs. 2 and 4 it will be noted that the drawing here illustrates a sealing ring 19 supported by the cylinder head for yielding engagement with the inner wall of the sleeve valve means, this sealing ring being preferably split as at 20, a portion of said sealing ring adjacent the split being secured or otherwise locked to the engine element which supports the same by means of a key or other fastening device 21.

The rotary motion of the sleeve, as indicated by arrow 22 in Fig. 4, acts upon the ring 19 if same is locked in the normal manner, in such a way as to tend to similarly move the sealing ring 19, this movement having a tendency to unwrap the sealing ring from the engine element supporting the same, this unwrapping tendency resulting in the production of a self energized braking effect of the ring with respect to the sleeve valve means.

In order to prevent the sleeve motion from inducing the self energizing braking effect of the ring for the sleeve, it is our purpose to so lock or otherwise secure the ring to the re-entrant portion of the cylinder head so as to lock the ring against such rotary movement, this securing means consisting of a key or other suitable fastening means 21 which securely anchors the ring to the engine element associated therewith. It will be noticed that the motion of the sleeve is thus of such a character as to induce the ring to wrap itself around the engine element more tightly, and thus, it will be noted that the binding tendency of the ring with the sleeve is substantially eliminated or prevented.

In Fig. 4 we have noted the direction of the rotary motion of the sleeve valve means A by means of arrow 22. The key or other suitable fastening means 21 is supported by the engine element, in this particular illustration the key being supported by the re-entrant portion 15 of the cylinder head structure adjacent to the split 20 and to that side of the split in the direction of rotary motion of the sleeve to secure the desired wrapping tendency instead of the aforesaid unwrapping tendency of the ring with respect to the inner engine element by which said ring is supported.

In Figs. 5 and 6 we have respectively illustrated two positions of a sealing ring of modified construction, particularly illustrating a securing means of modified construction for the ring. Referring more particularly to Figs. 5 and 6, it will be noted that the sealing ring 29a is split as at 29b and the inner portion of said ring is recessed as at 29c adjacent to each end of the split sealing ring. Suitable pins or other fastening devices 21a and 21b are carried by the cylinder head portion 15 and project into the recesses 29c. It will be noted that these recesses 29c are elongated and it will be further noted that the ring is induced to move circumferentially of the cylinder head until the pin 21a is engaged by the end of the elongated recess 29c, the ring being thus secured to prevent the tendency of same being expanded or unwrapped with respect to the engine element that supports the same, and thus there is no self energizing braking effect of the ring for the sleeve as the sleeve motion tends to wrap the ring about the cylinder head portion 15. In Fig. 6 it will be noted that the direction of the sleeve travel is directly opposite to that illustrated in Fig. 5, the cooperating action of the pins and recesses being substantially reversed from that shown in Fig. 5, and thus it will be noted that all self energizing braking effect is eliminated irrespective of the direction of the rotary motion of said sleeve valve means.

Instead of securing both ends of the split sealing ring to the supporting engine element, we have discovered that the effect of the sleeve on the sealing ring is negligible during certain portions of the engine cycle, but is very important during other portions of the engine cycle. To be more specific, it will be observed that when the pressure of the fluid in the combustion chamber is relatively high, the sealing rings are pressed against the sleeve valve means with a greater pressure due to the building up of pressure in the sealing ring grooves and thus the rotary motion of the sleeve on a ring, which is fixed against relative rotation with respect to its support, has more effect when the ring is pressed tightly against the sleeve for increasing the tendency of the ring to unwrap itself from the supporting engine element. At other times during the engine cycle when the pressure within the combustion chamber is at a minimum, the outward pressure exerted on the sealing ring is negligible and the intensity of the frictional contact between the ring and sleeve is not as great, lubrication of the sleeve and ring being more readily had, thus further facilitating slipping of the ring or rings with respect to the sleeve valve means.

Referring to Figs. 7 and 8, it will be noted that the relative timing of the crank and sleeve is diagrammatically illustrated respectively with an engine of the two stroke cycle type and four stroke cycle type.

In the two stroke cycle engine, the sleeve valve is actuated at crankshaft speed, the sleeve having a complete cycle for every revolution of the crankshaft. As customary with engines of the aforesaid type, the sleeve is preferably advanced slightly with respect to the crank. The curve B (Fig. 7) represents the path of travel of any point on the sleeve, while the circle C represents crank travel. It will be noted that the point 30 on the sleeve curve B is here represented at top dead center (T. D. C.) of the sleeve travel. The corresponding position of the piston is represented by the point 30a and it will be noted that the crank or piston has not reached top dead center (T. D. C.). The amount of the advance or the retardation of the sleeve with respect to the crank does not materially affect the principles of the invention, the engine being illustrated with this particular timing since this is the usual practice with engines of this type. Referring to the crank timing diagram C it will be noted that exhaust opens at the point designated E. O., scavenge begins at the point designated I. O., exhaust closes at the point designated E. C., and scavenge ends at the point designated I. C. Combustion begins at the point indicated by reference character F. Compression begins at point I. C. and, of course, continues to the point F, and following the ignition of the charge, at point F, the pressure in the combustion chamber immediately increases very rapidly and then falls off as the piston travels inwardly of the engine cylinder. A segment of the curve C has been indicated as representing the "High pressure zone", this being that part of the engine cycle in which the pressure of the gases in the combustion chamber is relatively high. Corresponding reference characters are applied to the curve B designating the exhaust and intake opening and closing as well as point F which represents the sleeve position on ignition of the charge in the combustion chamber, thus F may refer to the beginning of combustion.

It will be noted that the sleeve travel is such, that during that portion of the engine cycle in which the pressure in the combustion chamber is relatively high and designated in the figures by the notation "High pressure zone", the sleeve is moving with a rotary motion in a direction as indicated by the arrow 31. When the sleeve is moving with a rotary motion in the opposite direction as indicated by arrow 31a due to the oscillatory motion of the sleeve travel, it will be noted that the pressure in the combustion chamber is negligible as the intake is opened and the charge is being introduced into the engine cylinder, the gas pressure within the cylinder being then approximately atmospheric.

In Figs. 5 and 6, it will be noted that means are provided for selectively holding both ends of the sealing ring, one pin 21a engaging the end of the recess 29c as shown in Fig. 5 when the direction of sleeve travel is as indicated by the arrow 25, while in Fig. 6, it will be noted that the direction of sleeve travel is reversed as shown by arrow 25a and thus the other pin 21b is brought into operation. The arrangement shown in Figs. 5 and 6 is such as to prevent the self energizing braking effect of the ring with respect to the sleeve for both directions of sleeve travel. When the sleeve is moving with a rotary motion as indicated by arrow 31a, and the pressure in the engine cylinder is substantially atmospheric, it has been found that the self energizing braking effect induced by the sleeve motion is negligible since the sealing ring is not forced into a tight contact with the sleeve valve means and thus, providing that proper lubrication is had, there seems to be no great tendency toward inducing a self-energizing braking effect of the ring for the sleeve valve means resulting from sleeve motion in this direction, and therefore, it has been found possible to eliminate one of the ring securing means as illustrated more clearly in Fig. 4. In Fig. 4 it will be noted that only one end of the sealing ring is secured to the engine element by which it is supported, the arrangement as shown being such that the motion of the sleeve in the direction as indicated by arrow 22, which corresponds to arrow 31, tends to induce a wrapping tendency of the ring instead of an unwrapping tendency with respect to the engine element by which it is supported, thereby preventing the building up of the self energizing braking effect which would cause the ring to bind tightly with the sleeve valve means and interfere with the efficient operation of the engine.

In Fig. 8 the timing of the crank and sleeve valve is diagramatically illustrated for a four stroke cycle engine in which the sleeve valve means is operated at half crankshaft speed. In this figure it will be noted that the point 40 represents a point on the sleeve when the sleeve is at top dead center (T. D. C.). The beginning of combustion takes place at F and the sleeve is moved through an angle of approximately 90° of sleeve travel during the power stroke, exhaust opens as designated by E. O., intake opens as designated by I. O., then exhaust closes as indicated by E. C., while the intake closes as indicated by I. C. Compression takes place between I. C., and F, and it will be noted that we have indicated in Fig. 8 a zone of high pressure which begins in the latter portion of the compression stroke and ends substantially midway of the power stroke. The arrow 41 indicates the direction of sleeve travel during the time the gases in the combustion chamber are subjected to this relatively high pressure while the arrow 41a indicates the sleeve motion in the opposite direction, and it will be noted that this opposite sleeve motion takes place when the pressure in the cylinder is substantially atmospheric due to the fact that this takes place near the end of the exhaust stroke and during the beginning of the intake stroke.

Referring to the crank diagram for the four stroke cycle engine as illustrated in Fig. 8, it will be noted that the crank is revolved through two revolutions for one revolution of the sleeve. F. indicates the beginning of combustion corresponding to the same reference character as applied to the sleeve travel diagram. E. O., I. O., E. C. and I. C., respectively indicate exhaust opening, intake opening, exhaust closing and intake closing, which events correspond with the similar reference characters as applied to the sleeve travel diagram. It will be noticed that the power stroke comprises substantially 180° of the crank travel, the exhaust then opening while the piston is travelling outwardly of the cylinder and the exhaust cycle extends preferably for a period greater than 180° of crankshaft travel, the intake being opened prior to the closing of the exhaust and remaining open for a time after the closing of the exhaust sufficient to permit the intake of an adequate supply of the combustible charge which is drawn into the engine cylinder. Compression takes place between I. C., and F. It will be thus noted that when the piston is at top dead center (T. D. C.) at the end of the compression stroke, and beginning of power stroke; that the pressure in the combustion chamber is relatively high as indicated by the arc designated as "High pressure zone." At this time the sleeve is moving with a rotary motion in a direction as indicated by arrow 41. Following the power stroke and exhaust stroke, it will be noted that the piston is again at top dead center (T. D. C.) and the sleeve is traveling with a rotary motion in the opposite direction as indicated by arrow 41a, but it will be observed that at this time the pressure in the combustion chamber is approximately atmospheric because it occurs near the end of the exhaust and beginning of the intake, and thus the tendency of the sleeve motion inducing a self-energizing braking effect of the sealing ring with respect to the sleeve valve means is negligible, making it unnecessary for all practical purposes to provide a securing means for anchoring the other end of the sealing ring to the engine element by which it is supported for preventing the unwrapping tendency of the ring as induced by the rotary motion of the sleeve in this direction since such tendency is negligible.

In Fig. 3 it will be noted that the present invention is also embodied in a piston particularly adapted for operation in a sleeve valve engine, the piston having a reciprocating motion within the sleeve valve and the sealing rings carried by the piston are thus subjected to the influence of the oscillating or rotary travel of the sleeve valve, this rotary motion of the sleeve tending to also induce a self-energizing braking effect of the sealing rings carried by the piston with respect to the sleeve valve means in a manner similar to the operation of the sealing ring carried by the cylinder head. Due to the reciprocating motion of the piston, it has been observed that there is less tendency of the sealing rings carried by the piston to bind with the sleeve valve than is the case with the sealing rings carried by the cylinder head which is held stationary. The present invention is however, advantageously employed in connection with sealing rings carried by a piston, a cylinder head or other engine part. In the construction shown in Fig. 3, it will be noted that a pair of keys 50 and 50a are employed for locking the sealing rings 19a to the piston. It will be noted that the key 50 locks the first and third sealing rings to the piston, while key 50a locks the second and fourth sealing rings to the piston, this construction conforming in general with the usual practice of assembling sealing rings so that the splits in said sealing rings do not line up with each other.

It will be observed that the principles of the present invention will materially improve engine performance since the construction as shown in the illustrated embodiment of our invention will provide one in which adequate lubrication of the sleeve is had, a close fit between the operating parts of the engine being permissible without the danger of the sealing rings binding with the sleeve valve.

It will be apparent to those skilled in the art to which our invention pertains that various modifications and changes may be made therein without departing from the spirit of our invention or from the scope of the appended claims.

What we claim as our invention is:

1. In a device of the character described, a pair of engine elements having relative rotary motion during engine operation, a split sealing ring between said elements and yieldingly engaging one of said elements, and means securing said ring to said other element to anchor same whereby the relative rotary motion of said elements tends to decrease the pressure of the yielding engagement of said ring with said first element.

2. In a device of the character described, a pair of engine elements having relative rotary motion during engine operation, a split sealing ring between said elements and yieldingly engaging one of said elements, and means securing said ring to said other element whereby to anchor same and prevent the unwrapping effect of said ring with said latter element.

3. In a device of the character described, a pair of engine elements having relative rotary motion during engine operation, a split sealing ring between said elements and yieldingly engaging one of said elements, and means securing said ring portion adjacent the split to said other element whereby to anchor same and prevent the self-energizing braking effect of said ring for said first element.

4. In a device of the character described, a pair of concentric substantially engaging engine elements having relative rotary motion during engine operation, a split sealing ring supported by said inner engine element and yieldingly engaging said outer engine element, and means securing said ring to said inner engine element to anchor same whereby the relative rotary movement of said elements tend to decrease the pressure of the yielding engagement of said ring with said outer engine element.

5. In a device of the character described, a pair of concentric substantially engaging engine elements having relative rotary motion during engine operation, a split sealing ring supported by said inner engine element and yieldingly engaging said outer engine element, and fastening means attaching one end of said ring adjacent to the split to said inner element whereby to anchor one end of the ring and permit relative movement of the other end of said ring with respect to said inner element; said fastening means being positioned to that side of the split in the direction of the movement of said outer element relative to the inner element whereby to induce a wrapping of the ring about the inner element under the influence of the relative rotary motion of said elements.

6. In a device of the character described, a pair of concentric substantially engaging engine elements having relative rotary motion during engine operation, a split sealing ring supported by said inner element and yieldingly engaging said outer element, means for locking one end and only of said ring to the inner element, said locking means being positioned to that side of the split in the direction of the movement of said outer element relative to the inner element, whereby to induce a wrapping of the ring about the inner element under the influence of the relative rotary motion of said elements.

7. In an internal combustion engine of the sleeve valve type, a cylinder, sleeve valve means operable in said cylinder, an engine element co-operating with said sleeve valve means and defining one of the boundary walls of a combustion chamber, said sleeve valve means having a relative rotary motion with respect to said element, a sealing ring supported by said element and yieldingly engaging said sleeve valve means to seal against the escape of fluid from the combustion chamber, and means securing the ring to said engine element to anchor same and whereby the relative rotary motion of the valve means with said element tends to decrease the pressure of the yielding engagement of said ring with said sleeve valve means.

8. In an internal combustion engine of the sleeve valve type, a cylinder, sleeve valve means operable in said cylinder, an engine element cooperating with said sleeve valve means and defining one of the boundary walls of a combustion chamber, said sleeve valve means having a relative rotary motion with respect to said element, a split sealing ring and means securing the ring to said element against relative rotary motion therewith, said ring yieldingly engaging said sleeve valve means to seal against the escape of fluid from the combustion chamber, said sleeve motion acting on said ring during that portion of the engine cycle in which relatively high pressures are present in the combustion chamber to induce an unwrapping effect of said ring with the sleeve valve means, the means securing said ring to the engine element acting to prevent a self-energizing braking effect of the ring for said sleeve valve means.

9. In an internal combustion engine of the sleeve valve type, a cylinder, sleeve valve means of the combined oscillating and reciprocating type operable in said cylinder, an engine element cooperating with said sleeve valve means and defining one of the boundary walls of a combustion chamber, a split sealing ring, and means securing the ring to said element against relative rotary motion therewith, said ring yieldingly engaging said sleeve valve means to seal against the escape of fluid from the combustion chamber, said oscillatory sleeve motion acting on said ring during that portion of the engine cycle in which relatively high pressures are present in the combustion chamber to induce an unwrapping effect of said ring with the sleeve valve means, the means securing said ring to the engine element acting to prevent a self-energizing braking effect of the ring for said sleeve valve means.

10. In an internal combustion engine of the sleeve valve type, a cylinder, sleeve valve means of the combined oscillating and reciprocating type operable in said cylinder, an engine element cooperating with said sleeve valve means and defining one of the boundary walls of a combustion chamber, a split sealing ring, and means securing said ring to said element against relative rotary motion therewith, said ring yieldingly engaging said sleeve valve means to seal against the escape of fluid from the combustion chamber, said oscillatory sleeve motion acting on said ring during that portion of the engine cycle in which relatively high pressures are present in the combustion chamber tending to induce an unwrapping effect of said ring with the sleeve valve means, the said ring securing means fastening the end of said ring adjacent to said split to said engine element and acting to prevent a self-energizing braking effect of the ring for said sleeve valve means.

11. In an internal combustion engine of the sleeve valve type, a cylinder, sleeve valve means of the combined oscillating and reciprocating type operable in said cylinder, an engine element cooperating with said sleeve valve means and defining one of the boundary walls of a combustion chamber, a split sealing ring supported by said element and yieldingly engaging said sleeve valve means to seal against the escape of fluid from the combustion chamber, said oscillatory sleeve motion acting on said ring during that portion of the engine cycle in which relatively high pressures are present in the combustion chamber tending to induce said ring to expand as a result of the self-energizing braking effect beginning in one end portion of said ring, and fastening means securing the latter end portion of the ring to said element whereby to prevent said induced self-energizing braking effect.

12. In an internal combustion engine of the sleeve valve type, a cylinder, sleeve valve means of the combined oscillating and reciprocating type operable in said cylinder, a cylinder head cooperating with said sleeve valve means for closing the outer open end of the cylinder and defining the outer boundary walls of a combustion chamber, a split sealing ring supported by said cylinder head and yieldingly engaging said sleeve valve means to seal against the escape of fluid from the combustion chamber, said oscillatory sleeve motion acting on said ring when fixed to the cylinder head against relative rotary motion therewith during that portion of the engine cycle in which relatively high pressures are present in the combustion chamber to induce a self-energizing braking effect of said ring with the sleeve valve means, and means securing said ring to the cylinder head to prevent said induced self-energizing braking effect.

13. In an internal combustion engine of the sleeve valve type, a cylinder, sleeve valve means of the combined oscillating and reciprocating type operable in said cylinder, a piston cooperating with said sleeve valve means and defining one of the boundary walls of a combustion chamber, a split sealing ring supported by said piston and yieldingly engaging said sleeve valve means to seal against the escape of fluid from the combustion chamber, said oscillatory sleeve motion acting on said ring when fixed to the cylinder head against relative rotary motion therewith during that portion of the engine cycle in which relatively high pressures are present in the combustion chamber to induce a self-energizing braking effect of said ring with the sleeve valve means, and means securing said ring to the piston to prevent said induced self-energizing braking effect.

14. In an engine assembly of the character described, a split sealing ring for inner and outer concentric substantially engaging engine elements having a relative rotary motion, said ring being supported by said inner element and yieldingly engaging said other element, the relative movement of said elements having a tendency to unwrap said ring from the inner element and bind against said outer element with a self-energizing braking effect when the ring is fixed against relative rotation with said inner element, and means for securing said ring to said inner element to prevent the said induced unwrapping tendency.

EDWARD T. VINCENT.
JOHN R. McVEIGH.